DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 7, 1970

873 O.G. 18

T873,005
PROCESS FOR MANUFACTURING A PROTECTIVE PACKAGE

Spencer D. Snook and Ted L. Douglas, both of P.O. Box 511, Kingsport, Tenn. 37662

Continuation of application Ser. No. 765,506, Oct. 7, 1968. This application Nov. 3, 1969, Ser. No. 871,663
Int. Cl. B29c *17/04;* B32b *1/10*
U.S. Cl. 264—259
2 Sheets Drawing. 10 Pages Specification

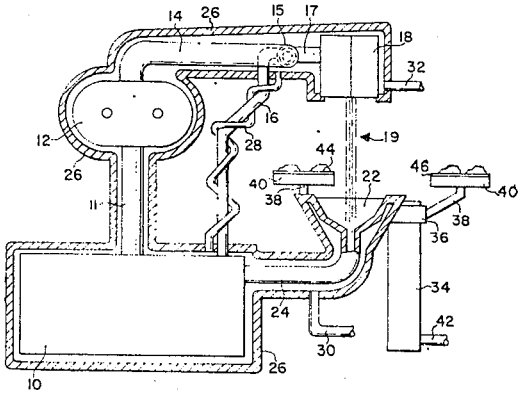

Figure 1:
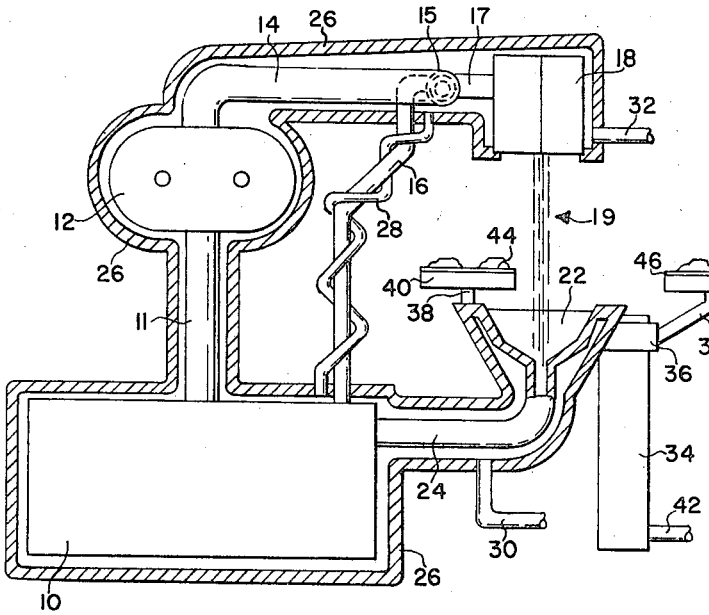
Figure 2:
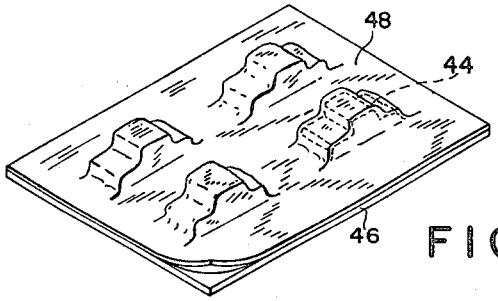
Figure 3:
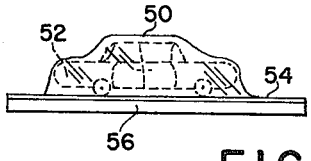
Figure 4:
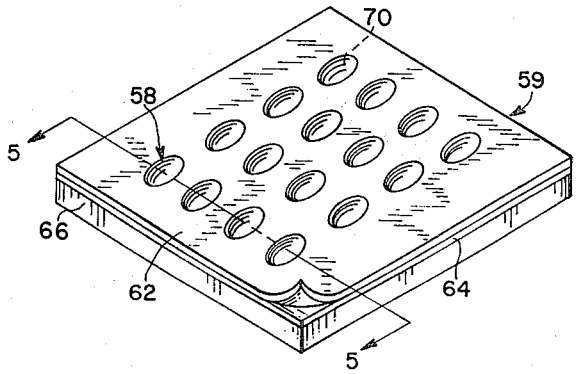
Figure 5:
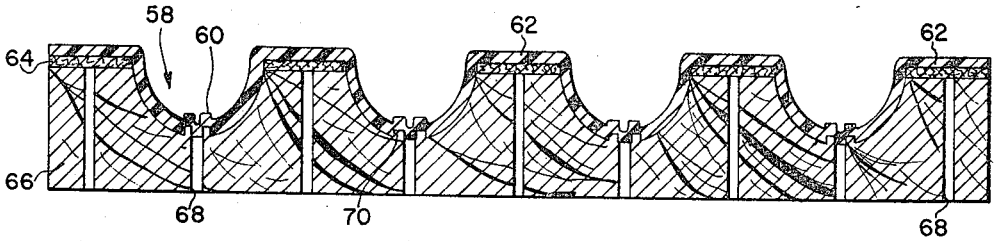

An improved process for manufacturing a protective package in which a plastic package component is formed directly from pellets without an intermediate solid film-forming step. As shown in FIGURE 1, a viscous, film-forming thermoplastic is continuously extruded into a falling curtain (19). A mold (44) contoured to the shape of the article to be packaged is passed through the curtain, thus, coating the mold with the thermoplastic. A pressure differential is created across the coated mold to cause the thermoplastic to assume the desired shape of the mold. The thermoplastic is then allowed to cool and is removed from the mold. The extruded film must be bubble-free and a preferred material is cellulose acetate butyrate. The mold may be either a male or female type and may be associated with a substrate to which the thermoplastic is bonded as the film is formed over the mold.

PROCESS FOR MANUFACTURING A PROTECTIVE PACKAGE

Original Filed Oct. 7, 1968 2 Sheets-Sheet 1

SPENCER D. SNOOK
TED L. DOUGLAS
INVENTORS

BY William T. French
George P. Chandler
ATTORNEYS

PROCESS FOR MANUFACTURING A PROTECTIVE PACKAGE

Original Filed Oct. 7, 1968 2 Sheets-Sheet 2

SPENCER D. SNOOK
TED L. DOUGLAS
INVENTORS

BY
George P. Chandler
ATTORNEYS